United States Patent [19] [11] 4,042,537
Dahm et al. [45] Aug. 16, 1977

[54] PROCESS FOR THE PRODUCTION OF POLYURETHANE FOAMS

[75] Inventors: Manfred Dahm, Bergisch Neukirchen; Alberto Carlos Gonzalez-Dorner, Leverkusen, both of Germany

[73] Assignee: Bayer Aktiengesellschaft, Leverkusen, Germany

[21] Appl. No.: 578,051

[22] Filed: May 15, 1975

[30] Foreign Application Priority Data

May 17, 1974 Germany .............................. 2423984
Mar. 27, 1975 Germany .............................. 2513816

[51] Int. Cl.² ...................... C08G 18/14; C08G 18/28
[52] U.S. Cl. ........................ 260/2.5 AP; 260/2.5 AM; 260/2.5 BE; 260/33.4 R; 260/858
[58] Field of Search ................... 260/2.5 BE, 33.4 R, 260/858, 2.5 AP, 2.5 AQ, 2.5 AM

[56] References Cited

U.S. PATENT DOCUMENTS

| 3,294,711 | 12/1966 | von Bonin | 260/2.5 BE |
| 3,325,421 | 6/1967 | Muller | 260/77.5 AM |
| 3,383,351 | 5/1968 | Stamberger | 260/2.5 BE |
| 3,523,093 | 8/1970 | Stamberger | 260/2.5 BE |
| 3,752,786 | 8/1973 | Rossitto et al. | 260/33.4 R |

FOREIGN PATENT DOCUMENTS 2,110,055 9/1972 Germany
1,360,131 7/1974 United Kingdom Primary Examiner—Donald E. Czaja
Assistant Examiner—H. H. Fletcher
Attorney, Agent, or Firm—Gene Harsh; Joseph C. Gil

[57] ABSTRACT

The instant invention is directed to polyurethane foams and the process for their manufacture, wherein an organic polyisocyanate is reacted, in the presence of a blowing agent, with a dispersion of a polyurea and/or a polyhydrazodicarbonamide in a relatively high molecular weight organic compound containing at least one hydroxyl group.

18 Claims, No Drawings

PROCESS FOR THE PRODUCTION OF POLYURETHANE FOAMS

BACKGROUND OF THE INVENTION

For some time now, foams with a variety of different physical properties have been produced by the isocyanate polyaddition process from compounds containing several active hydrogen atoms, especially those compounds containing hydroxyl and/or carboxyl groups, and polyisocyanates, optionally in the presence of water, activators, emulsifiers, foam stabilizers and other additives (cf. R. Vieweg, A. Hochtlen, Kunststoff-Handbuch, Vol. VII, Polyurethane, Carl-Hanser-Verlag, Munich 1966).

By virtue of this process, it is possible, by suitably selecting the components, to obtain both elastic and rigid foams or any intermediate variants.

Soft-flexible polyurethane foams are widely used as upholstery materials in the manufacture of seat and back cushioning. Hard polyurethane foams are in demand as insulation materials against heat and cold, for example, in the refrigeration and building industries. In the form of structural foams (so-called "integral foams"), which have a densified to compact external structure, but have a cellular internal structure, hard foams are also used in the furniture and hobby industries.

Soft-flexible foams are expected to provide a high degree of comfort comparable with that of foams of natural latex or with that of a combination of standard upholstery materials, such as feathers, natural hair or wadding. Physically, the quality of the upholstery may be represented by the so-called "sag factor" (i.e. the quotient of the hardness value at 65% and 25% compression, the overall deflection being kept constant for 1 minute in either case) and the trend of the compression-deflection curves. To obtain good upholstery properties, the sag factor should have a value above 2.5, while the compression-deflection curves should not have any plateaux. In other words, minimal changes in deflection should not be accompanied by any significant change in deflection.

Another requirement which a foam intended for use in the upholstery industry has to satisfy is that its strength properties should be as high as possible to prevent tearing under mechanical stressing, such as may occur, for example, in the event of coating with textiles. Additionally, the hardness should be as high as possible for a given density (kg/m$^3$). For economic reasons, foams with densities of from 15 to 30 kg/m$^3$ are particularly preferred.

Hard polyurethane foams are expected to be as hard as possible, without being brittle, for the lowest possible densities. Tough foams are much more widely used than brittle hard foams in the industrial sector. For example, foams which are tough and flexible may be used in the manufacture of refrigerators and sandwich elements and in any applications where vibration is encountered, such as, in motor vehicles.

In order to satisfy these various requirements, attempts have already been made to use inert organic or inorganic fillers. Thus, it is known that solid additives may be introduced into one of the components used for foaming or directly into the foaming mixture, such as by directly introducing the fillers into the mixing chamber of a foaming machine. Attempts have also been made to carry out polymerization reactions in the polyols used for foaming. For example, dispersions of copolymers of styrene and acrylonitrile in polyethers containing hydroxyl groups have been used for this purpose.

Advantages of using fillers include greater hardness levels, increased elasticity in the case of soft foams, and reduction in the cost of the foam system according to the type of filler used. Unfortunately, these advantages are offset by serious disadvantages. Thus, it is difficult in cases where conventional fillers are used to prepare dispersions with such a fine grain distribution that storable mixtures are formed. The danger of sedimentation is always very pronounced, with the result that dispersions of this type have to be continuously stirred in order to eliminate the need for difficult re-dispersion operations. In cases where vinyl monomers are directly copolymerized in the polyols, the particles obtained are so small that there is generally no further tendency towards sedimentation. One disadvantage of these dispersions, however, is that they have to be free from monomers if they are to form substantially odorless foams which will be used for the typical applications of the foams. In order to insure that such dispersions are monomer free, the entire dispersion generally has to be passed through thin-layer distillation systems at elevated temperatures.

In fact, the copolymerization reaction itself is a critical step, since the radical initiators used in the polymerization of the vinyl compounds may increase the danger of chain cleavage in the polyethers. Not only may this interfere with the foaming process as a whole, but it may also result in the formation of foams with inferior properties. In the preparation of dispersions of this type, it is also necessary to use extremely pure monomers as starting materials in order to reduce internal discoloration of the foams as far as possible.

The use of fillers or of polyol dispersions containing fillers is attended by a number of disadvantages. Thus, fillers have a marked effect upon the mechanical properties of the foams. In general, the permanent set of soft foams is undesirably increased and their tensile strength and breaking elongation reduced, while the toughness of hard foams is reduced. This change in properties is particularly unpleasant in the case of highly flexible soft polyurethane foams because relative to these foams, the mechanical property level is already low.

According to German Offenlegungsschrift No. 2,110,055, highly flexible polyurethane foams may be obtained by reacting polyisocyanates with polyethers and low molecular weight crosslinking or chain-extending agents, such as aliphatic, cycloaliphatic or aromatic glycols, or amino-glycols or aliphatic, cycloaliphatic or aromatic amines, in the presence of blowing agents, catalysts and, optionally, other additives, but substantially in the absence of foam stabilizers of the polyether-polysiloxane type.

Unfortunately, this process has considerable disadvantages. Thus, it cannot be used for the production of foams with a wide density range. Although it is possible by this process to produce foams with high densities, it is difficult, if not impossible, to reduce the density of the foams to values below 30 kg/m$^3$. This is a considerable disadvantage for commercial and economical reasons because foams are generally handled according to volume and a certain volume should have as low a weight as possible.

DESCRIPTION OF THE INVENTION

It has now surprisingly been found that the disadvantages described above may be overcome by using, as starting materials for the production of polyurethane foams, dispersions of polyureas and/or polyhydrazodicarbonamides in high molecular weight compounds containing at least one isocyanate-reactive hydrogen atom.

Accordingly, the present invention relates to a process for the production of polyurethane foams by reacting polyisocyanates with high molecular weight hydroxyl compounds in the presence of known blowing agents and optionally in the presence of catalysts and foaming aids and additives and optionally using chain extenders and/or cross-linkers, wherein the high molecular weight compound is a dispersion of a polyurea and/or a polyhydrazodicarbonamide in high molecular weight compound containing at least one hydroxyl group.

According to one specific embodiment of the present invention, distilled tolylene diisocyanate is reacted with a polyether having at least two hydroxyl groups and a molecular weight of from 1500 to 10,000 and preferably with at least 10% by weight of the hydroxyl groups being primary hydroxyl groups, in the presence of a blowing agent and in the presence of a reaction product of (a) hydrazine derivatives and/or hydrazine adducts of the general formula

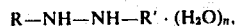

wherein R and R', which may be different or the same, each represent a hydrogen atom or an alkyl, cycloalkyl, aralkyl aryl or aryl radical, and $n = 0$ or 1, and (b) a polyisocyanate, the foaming reaction being carried out in the absence of foam stabilizers of the polyether-polysiloxane block copolymer type and optionally in the presence of catalysts, further additives and/or chain extending and/or cross-linking agents.

In the above formula, R and R' are preferably $C_1$-$C_{12}$ alkyl, $C_5$-$C_4$ cycloalkyl, $C_6$-$C_{14}$ aryl, $C_7$-$C_{20}$ aralkyl or $C_1$-$C_{12}$ aryl radicals. Most preferably, R and R' are $C_1$-$C_6$ alkyl groups, $C_5$-$C_{10}$ cycloalkyl groups, $C_6$-$C_{10}$ aryl groups, $C_7$-$C_{10}$ aralkyl groups, or $C_1$-$C_8$ aryl groups. If R and R' are alkyl or cycloalkyl groups, these groups can optionally be substituted by cyano or amino groups. If R and R' are aryl or aralkyl groups, these groups can optionally be substituted by halogen atoms such as chlorine or by nitro groups. The most especially preferred compounds are hydrazine and hydrazine hydrate.

The advantages of using dispersions according to the present invention are numerous. Thus, the dispersions may be prepared very easily by reacting approximately equivalent quantities of isocyanates and polyamines, hydrazines or hydrazine adducts in the high molecular weight compounds containing at least one active hydrogen atom. Quantitative conversions are obtained by virtue of the high reactivity of both reactants. As a result, starting materials no longer have to be removed from the dispersion and, foams whose odor is no stronger than that of normal soft polyurethane foams are formed. The dispersions are very finely divided, so that substantially, no sedimentation occurs. In cases where hydrazines and hydrazine adducts are used for preparing th dispersions, the foams obtained are very white and, even in the event of prolonged exposure to daylight, only discolor very slowly and to a very limited extent.

In contrast to the use of standard organic and inorganic fillers, the mechanical properties of the foams are improved in cases where these dispersions are used. Thus, considerable increases in hardness are observed in conventional soft polyether foams without any reduction in tensile strength and elongation at break. This effect is so pronounced that it is possible to produce semi-hard polyether foams even in cases where typical soft foam polyethers are used as dispersants in the polyurea or polyhydrazodicarbonamide-polyether dispersion.

Highly flexible soft foams produced from polyethers which contain at least 2 hydroxyl groups and in which at least 10% by weight of the hydroxyl groups present are primary hydroxyl groups, are also improved in regard to their properties by the corresponding dispersions. Without any substantial change in the high elasticity values (i.e. with sag factors above 2.5) higher compression hardnesses are obtained, while at the same time, tensile strength, elongation at break and permanent set are improved.

In accordance with the instant invention, it is now possible to produce foams of a wide density range, i.e. with densities of from about 18 to about 50 kg/m³. The use of the dispersions according to the invention also has the advantage over the use of hydrazines and hydrazine adducts alone as chainextenders in the in situ production of the foams since substantially no corrosion problems arise.

As mentioned above, dispersions of polyureas and/or polyhydrazodicarbonamides in high molecular weight compounds containing at least one hydroxyl group may be used in the process of the instant invention. Some of these dispersions are known and have been described, for example, in German Auslegeschrift 1,260,142 (U.S. Pat. No. 3,325,421). The polyureas and polyhydrazodicarbonamides are obtained by reacting organic monofunctional bifunctional or higher functional isocyanates with (a) polyamines containing primary and/or secondary amino groups and/or (b) hydrazines and/or hydrazides. The polyamines usable generally have molecular weights of from about 60 to about 10,000 and preferably from about 60 to about 3,000, the molecular weight range of from 60 to 1000 being particularly preferred.

Suitable polyamines include: divalent and/or higher polyvalent primary and/or secondary, aliphatic, araliphatic, cycloaliphatic or aromatic amines. Specific examples include ethylene diamine, 1,2- and 1,3-propylene diamine, tetramethylene diamine, hexamethylene diamine, dodecamethylene diamine, trimethyl diaminohexane, N,N'-dimethyl ethylene diamine, 2,2'-bis-aminopropyl methylamine, higher homologues of ethyl diamine, such as diethylene triamine, triethylene tetramine and tetraethylene pentamine, homologues of propylene diamine, such as dipropylene triamine, piperazine, N,N'-bis-aminoethyl piperazine, triazine, 4-aminobenzylamine, 4-aminophenylethylamine, 1-amino-3,3,5-trimethyl-5-aminomethyl cyclohexane, 4,4'-diaminodicyclohexylmethane and propane, 1,4-diaminocyclohexane, phenylene diamines, naphthylene diamines, condensates of aniline and formaldehyde, tolylene diamines, bis-aminomethylbenzenes and the derivatives of the above-mentioned aromatic amines monoalkylated on one or both nitrogen atoms.

Suitable hydrazines and hydrazides useful in accordance with the instant invention include hydrazine, methyl hydrazine, ethyl hydrazine, hydrazine hydrate, propyl hydrazine, isopropyl hydrazine, n-butyl hydrazine, isobutyl hydrazine, tert.-butyl hydrazine, butenyl hydrazine, dodecyl hydrazine, phenyl hydrazine, tolyl hydrazine, chlorophenyl hydrazine, nitrophenyl hydrazine, benzyl hydrazine, 2-phenylethyl hydrazine, cyclohexyl hydrazine, cyclopentyl hydrazine, β-cyanoethyl hydrazine, 1,2-dimethyl hydrazine, 1,2-diethyl hydrazine, 1,2-diisobutyl hydrazine, 1-butyl-2-methyl hydrazine, hydrazobenzene, 1-benzyl-2-phenyl hydrazine, oxallyl dihydrazide, semicarbazide, carbohydrazide, 4-methyl semicarbazide, 4-phenyl semicarbazide, isophthalic acid dihydrazide, β-hydrazinopropionic acid hydrazide, thio-semicarbazide, thiocarbohydrazide, amino guanidine, 1-amino-piperazine and 1,4-diaminopiperazine.

The hydrazides useable are generally the hydrazides of divalent or higher polyvalent carboxylic acids, such as carbonic acid, oxalic acid, malonic acid, succinic acid, adipic acid, sebacic acid, azelaic acid, maleic acid, fumaric acid, phthalic acid, isophthalic acid and terephthalic acid; the esters of hydrazinomonocarboxylic acid with dihydric or higher polyhydric alcohols and phenols, such as ethane diol, 1,2-propane diol, 1,2-butane diol, 1,3-butane diol and 1,4-butane diol, hexane diol, diethylene glycol, triethylene glycol, tetraethylene glycol, dipropylene glycol, tripropylene glycol and hydroquinone, and the amides of hydrazinomonocarboxylic acid (semicarbazides) with, for example, the above-mentioned diamines and polyamines.

The hydrazines generally have molecular weights of from 32 to 500, while the hydrazides generally have molecular weights of from 60 to 10,000, preferably from 60 to 3,000 and, with particular preference, from 60 to 1000. Hydrazine itself is the presently preferred material.

The above-mentioned amines and hydrazines are optionally used in the form of their standard commercial-grade aqueous solutions.

Isocyanates suitable for reaction with the above-mentioned polyamines, hydrazines and/or hydrazides include monoisocyanates, such as phenyl isocyanate or stearyl isocyanate and polyisocyanates, such as aliphatic, cycloaliphatic araliphatic, aromatic and heterocyclic polyisocyanates of the type described, for example, by W. Siefken in Justus Liebigs Annalen der Chemie, 562, pages 75 to 136. Specific examples include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate and mixtures of these isomers; 1-isocyanato-3,3,5-trimethyl-5-isocyanato methyl cyclohexane, (see e.g. German Auslegeschrift No. 1,202,785); 2,4- and 2,6-hexahydrotolylene diisocyanate and mixtures of these isomers, hexahydro-1,3- and/or 1,4-phenylene diisocyanate, perhydro-2,5'- and/or 4,4'-diphenyl methane diisocyanate, 1,3- and 1,4-phenylene diisocyanate, 2,4- and 2,6-tolylene diisocyanate and mixtures of these isomers, diphenyl methane-2,4'- and/or 4,4'-diisocyanate, naphthylene-1,5-diisocyanate, triphenyl methane-4,4',4"-triisocyanate, polyphenyl-polymethylene polyisocyanates of the type obtained by condensing aniline with formaldehyde, followed by phosgenation and such as described for example in British Pat. Nos. 874,430 and 848,671, perchlorinated aryl polyisocyanates of the type described in German Auslegeschrift 1,157,601, polyisocyanates containing carbodiimide groups of the type described in German Pat. No. 1,092,007, diisocyanates of the type described in U.S. Pat. No. 3,492,330, polyisocyanates containing allophanate groups of the type described, for example in British Pat. No. 994,890 in Belgian Pat. No. 761,626 and in published Dutch Pat. Application No. 7,102,524 polyisocyanates containing isocyanurate groups of the type described in German Pat. Nos. 1,022,789, 1,222,067 and 1,027,394 and in German Offenlegungsschrift 1,929,034 and 2,004,048, polyisocyanates containing urethane groups of the type described, for example, in Belgian Pat. No. 752,261 or in U.S. Pat. No. 3,394,164, polyisocyanates containing acylated urea groups as described in German Pat. No. 1,230,778, polyisocyanates containing biuret groups of the type described, for example, in German Pat. No. 1,101,392, in British Pat. No. 889,050 and in French Pat. No. 7,017,514, polyisocyanates obtained by telomerization reactions of the type described, for example, in Belgian Pat. No. 723,640, polyisocyanats containing ester groups of the type described, for example, in British Pat. No. 965,474 and 1,072,956, in U.S. Pat. No. 3,567,763 and in German Pat. No. 1,231,688 and reaction products of the aforementioned isocyanates with acetals as described in German Pat. No. 1,072,385.

It is also possible to use the distillation residues containing isocyanate groups accumulating in the commercial production of isocyanates, optionally in solution in one or more of the aforementioned polyisocyanates. In addition, it is possible to use mixtures of the aforementioned polyisocyanates.

According to the invention, it is preferred to use polyisocyanates.

In general, it is particularly preferred to use the readily accessible polyisocyanates, such as 2,4- and 2,6-tolylene diisocyanate and mixtures of these isomers ("TDI") polyphenyl-polymethylene polyisocyanates of the type obtained by condensing aniline with formaldehyde, followed by phosgenation ("crude MDI") and, polyisocyanates containing carbodiimide groups, urethane groups, allophanate groups, isocyanurate groups, urea groups or biuret groups ("modified polyisocyanates").

The hydroxyl containing compounds used in the production of the dispersions of the instant invention are compounds preferably containing from 1 to 8 and more preferably from 2 to 8 primary and/or secondary hydroxyl groups having a molecular weight of from 200 to 16,000 and more preferably from 500 to 10,000 and most preferably from 1500 to 10,000. The preferred hydroxyl containing materials are polyethers.

Suitable polyethers may be obtained in known manner and include those obtained by reacting starter compounds containing reactive hydrogen atoms with alkylene oxides, such as ethylene oxide, propylene oxide, butylene oxide, styrene oxide, tetrahydrofuran or epichlorohydrin, or with mixtures of these alkylene oxides. In many cases, it is preferred to use polyethers of the type which contain substantial amounts of primary OH-groups, i.e. at least 10% by weight of the OH groups are primary OH groups. Suitable starter compounds containing reactive hydrogen atoms include water, methanol, ethanol, ethylene glycol, 1,2- or 1,3-propylene glycol, 1,4- or 2,3-butylene glycol, 1,6-hexane diol, 1,8-octane diol, neopentyl glycol, 1,4-bis-hydroxy methyl cyclohexane, 2-methyl-1,3-propane diol, glycerol, trimethylol propane, 1,2,6-hexane triol, 1,2,4-butane triol, trimethylol ethane, pentaerythritol, mannitol, sorbitol, methyl glycoside, cane sugar, phenol isononyl phenol, resorcinol, hydroquinone, 1,2,2- and 1,1,3-tris-(hydroxy phenyl)-ethane, ammonia, methyl amine, ethylene diamine, tetra- or hexa-methylene diamine, diethylene triamine, ethanolamine, diethanolamine, triethanolamine, aniline, phenylene diamine, 2,4- and 2,6-diaminotoluene and polyphenylpolymethylene-polyamines of the type obtained by condensing aniline with formaldehyde. In addition, resin-like materials of the phenol and resol type may also be used as starters.

Polyesters containing hydroxyl groups are also suitable for use in the instant invention. These include the reaction products of polyhydric, preferably dihydric and optionally trihydric alcohols with polyvalent, preferably divalent, carboxylic acids. Instead of using the free polycarboxylic acids, it is also possible to use the corresponding polycarboxylic acid anhydrides or esters of lower alcohols or mixtures thereof for producing the polyesters. The polycarboxylic acids may be aliphatic, cycloaliphatic aromatic and/or heterocyclic and may optionally be substituted (for example by halogen atoms), and/or they may be unsaturated. Examples of polycarboxylic acids of this type include succinic acid, adipic acid, suberic acid, axelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, terephthalic acid dimethyl ester and terephthalic acid-bis-glycol ester. Suitable polyhydric alcohols are, for example, ethylene glycol, 1,2- and 1,3-propylene glycol, 1,4- and, 2,3-butylene glycol, 1,6-hexane diol, 1,8-octane diol, neopentyl glycol, cyclohexane dimethanol (1,4-bis-hydroxymethylcyclohexane), 2-methyl-1,3-propane diol, glycerol, trimethylol propane, 1,2,6-hexane triol, 1,2,4-butane triol, trimethylol ethane, pentaerythritol, quinitol, mannitol and sorbitol, methyl glycoside, also diethylene glycol, triethylene glycol, tetraethylene glycol, polyethylene glycol, dipropylene glycol, polypropylene glycol, dibutylene glycol, and polybutylene glycols. The polyesters may also contain terminal carboxyl groups. Polyesters of lactones, for example, ε-caprolactone, or hydroxy carboxylic acids, for example ε-hydroxy caproic acid, may also be used.

Other hydroxyl containing compounds suitable for use in the process according to the instant invention include polythioethers, polyacetals, containing polycarbonates, polyester amides, polyamides and other synthetic and natural polyols.

Among the polythioethers, reference is made in particular to the condensation products of thiodiglycol alone and/or with other glycols, dicarboxylic acids, formaldehyde amino carboxylic acids or aminoalcohols. Depending upon the co-components, the products are polythio-mixed ethers, polythio-ether esters or polythio-ether ester amides.

Suitable polyacetals include the compounds which may be obtained from glycols, such as diethylene glycol, triethylene glycol, 4,4'-dioxethoxy diphenyl dimethyl methane, hexane diol and formaldehyde. Polyacetals suitable for use in accordance with the invention may also be obtained by polymerizing cyclic acetals.

Suitable polycarbonates containing hydroxyl groups are known and include those which may be obtained, for example, by reacting diols, such as 1,3-propane diol, 1,4-butane diol and/or 1,6-hexane diol, diethylene glycol, triethylene glycol and tetraethylene glycol, with diaryl carbonates (for example diphenyl carbonate) or phosgene.

The polyester amides and polyamides include the predominantly linear condensates obtained from polyvalent saturated and unsaturated carboxylic acids or their anhydrides and polyhydric saturated and unsaturated amino alcohols, diamines polyamines and mixtures thereof.

Polyhydroxyl compounds already containing urethane or urea groups and optionally modified natural polyols such as castor oil, carbohydrates and starch, may also be used. Addition products of alkylene oxides with phenol-formaldehyde resins or even with urea formaldehyde resins, may also be used in accordance with the invention.

Respresentatives of the many and varied hydroxyl functional compounds which may be used in accordance with the invention are described, for example, in High Polymers, Vol. XVII, "Polyurethanes, Chemistry and Technology", by Saunders-Frisch, Interscience Publishers, New York, London, Vol. I, 1962, pages 32–42 and pages 44–54, and Vol. II, 1964, pages 5–6 and 198–199, and in Kunststoff-Handbuch, Vol. VII, Vieweg-Hochtlen, Carl-Hanser-Verlag, Munich 1966, pages 45 to 71.

The polyaddition products obtained by the process according to the invention, dispersed in compounds containing hydroxyl groups, may also be modified by the proportionate use of monofunctional isocyanates, amines, hydrazine derivatives or ammonia.

For example, the average molecular weight of the polyaddition products may be adjusted by incorporating mono-functional compounds of this type. In cases where alkanolamines with primary or secondary amino groups are used, it is possible to synthesize polyureas and polyurea polyhydrazodicarbonamides containing free hydroxyl groups. It is also possible to introduce other groups such as ester groups, and relatively long chain aliphatic radicals, tertiary amino groups, active double bonds, such as where correspondingly substituted monoamines or diamines and isocyanates are used.

The monofunctional compounds may generally be used in proportions of up to 40 mol% and more preferably in proportions of up to 25 mol% (based on total isocyanate and amine, hydrazine or hydrazide in the dispersion).

Suitable monofunctional isocyanates include methyl, ethyl, isopropyl, isobutyl, hexyl, lauryl and stearyl isocyanate, chlorohexyl isocyanate, cyclohexyl isocyanate, phenyl isocyanate, tolyl isocyanate, 4-chlorophenyl isocyanate and diisopropyl phenyl isocyanate.

Examples of monoamines include alkyl and dialkyl amines, with $C_1$–$C_8$ alkyl groups; cycloaliphatic amines, such as cyclohexyl amine and homologues; aniline and N-alkyl anilines; aniline derivatives substituted on the benzene nucleus, alkanolamines, such as ethanolamine, diethanolamine propanolamine, dipropanol amine, butanolamine and dibutanolamine and diamines with one tertiary and one primary or secondary amino group, such as N,N-dimethyl ethylene diamine and N-methyl piperazine. Suitable monofunctional hydrazine derivatives and hydrazides include, N,N-dialkyl hydrazines, the hydrazides of monocarboxylic acids, hydrazine monocarboxylic acid esters of monofunctional alcohols or phenols, and semicarbazides, such as methyl, ethyl, propyl, butyl, hexyl, dodecyl, stearyl, phenyl and cyclohexyl semicarbazide.

In cases where low-viscosity polyethers solely containing secondary OH-groups or substantially non-reactive (aliphatic) isocyanates are used, the proportion of co-reacting polyether molecules may be too small to form a stable dispersion. In this case, it is best to include in the polyaddition reaction, substances which have an emulsifying effect and, hence, increase the stability of the dispersion. Substances of this type include linear polyethers with an average molecular weight of from 300 to 4000 which contain NCO-groups or amino or hydrazide groups at one or both ends of the chain. It is preferred to use polyethers of the type which contain one of the above-mentioned reactive groups at only one end of the chain.

Modified polyethers with a dispersing effect which may optionally be used in the preparation of the dispersions include the addition products of excess diisocyanates and/or polyisocyanates of the type exemplified above, with monofunctional and/or bifunctional hydroxyl polyethers with an average molecular weight of from 300 to 4000 which may optionally have been freed from unreacted free isocyanate by thin-layer distillation. However, isocyanate prepolymers of this type may also be reacted with the excess free isocyanate to form allophanate isocyanates. It is also possible to convert the addition products containing terminal isocyanate groups with excess diamines or hydrazines into polyethers containing terminal amino or semicarbazide groups such as described, for example, in German Pat. Nos. 1,122,254 and 1,138,200.

Polyethers containing terminal amino groups of the type which may be obtained, for example, by the processes described in German Pat. No. 1,215,373 may also be used as dispersants in accordance with the invention.

Finally, hydroxyl polyethers may also be converted with phosgene into a chloroformic acid esters which may be subsequently reacted with excess diamine or hydrazine. As already mentioned, it is preferred to use polyethers of the type which contain an NCO— or NH$_2$— group at only one end of the chain.

As mentioned above, the production of the dispersions is partly known from German Auslegeschrift No. 1,260,142. The production is uncomplicated and may be carried out in several different ways. For example, it is possible to dissolve the polyamines, hydrazines, and/or hydrazides in the total quantity of hydroxyl compound and to add to the isocyanate while stirring. The reaction takes place immediately because of the high reactivity between the polyamine, the hydrazine and/or the hydrazide and the isocyanate. It is also possible, however, to dissolve the polyamine or hydrazine or hydrazide in part of the hydroxyl compound and to dissolve the isocyanate in the rest of the hydroxyl compound and to combine both solutions while stirring.

Production itself may be carried out both manually and by machine. In the most simple case, the two components are combined in a shear gradient produced by a conventional stirrer of the propellor- or blade-type. To produce relatively large quantities of reaction products (dispersed in the polyether), it is best to use machines of the type known from the technology of polyurethane foams.

The two components are then pumped separately in the form of solutions in the hydroxyl compound used as dispersant and mixed with one another in the mixing chambers of stirrers or by counter-current injection. In this case, too, the reaction product is immediately formed so that a clouded dispersion issues from the mixers.

The preparation of the dispersions may immediately precede foam formation, although it may also be carried out separately. In the first case, the reaction product dispersed in the polyether is initially prepared and is then immediately delivered to another mixer in which the other components required for foaming are added to it. In the second case, a polyether dispersion is prepared which may be stored for prolonged periods or transported and which may be converted at some later stage into a soft, semi-hard or hard polyurethane foam.

The quantitative ratio between the polyamine, hydrazine and/or hydrazide on the one hand and the monoisocyanate and/or polyisocyanate on the other hand may vary within wide limits during preparation of the dispersions. In general, the NCO:NH equivalent ratio is from 0.8:1 to 1.05:1 and more preferably from 0.9:1 to 1.02:1. It is particularly preferred to react equivalent quantities of the two components in the hydroxyl compound. In cases where a slight excess of isocyanate is used, dispersions or higher viscosity are obtained because the excess of isocyanate reacts with the hydroxyl compound.

The concentration of the polyureas and polyhydrazodicarbonamides in the hydroxyl compound may fluctuate within wide limits, although it is generally from 1 to 40% by weight and more especially from 1 to 25% by weight based on 100 parts by weight of hydroxyl compound.

Dispersions with polyurea or polyhydrazodicarbonamide contents of from 1 to 10% by weight per 100 parts by weight of hydroxyl compound are generally required for obtaining the required foam properties. It is of course, possible to adjust the requisite concentration directly at the production stage. For economic reasons, however, it is preferred to prepare a dispersion with as high a solids content as possible and subsequently to dilute it to the required concentration with the pure polyol.

Dispersions preferably used in accordance with the invention can be prepared as follows: the reaction components are delivered to a flow mixer of the type generally known in the art at room temperature. The reaction temperatures may rise to from 50° to 150° C both under the effect of the shear forces generated in cases where a dynamic mixer is used and under the effect of the heat of the polyaddition reaction generated depending upon the quantity of resinous solids. In general, however, it is best to maintain the temperature below 110° C (optionally by cooling the mixer), because otherwise any water which may be present evaporates and may give rise to disturbances as a result of bubble formation. In cases where hydrazine is used, it is important to ensure that the decomposition temperature or hydrazine is not exceeded.

An important feature of this process is that the polyaddition reaction of polyisocyanates and polyamines, hydrazines or hydrazides is carried out in high-performance continuous flow mixers with average residence times of less than 10 minutes and preferably less than 3 minutes.

The homogenization or dispersion time, $\theta$, should only amount to at most 10% of the average residence time, $\bar{\tau}$ in order to obtain thorough admixture of the components. According to the invention, it is possible, although not essential, to arrange two or even more flow mixers one behind the other. The times quoted above then apply to the mixer system as a whole.

Flow mixers are known and are divided into two groups, namely static mixers with fixed fittings and dynamic mixers with movable fittings operating on the rotor-stator principle. They may optionally be heated or cooled. In the case of static mixers, the mixing energy required is applied through pumps, whereas in the case of dynamic mixers a separate motor drives the rotor.

In every case, the dispersing effect and, hence, the particle size in the dispersion is governed by the energy applied and the shear force correspondingly generated.

Static mixers may be divided into the following groups:
   a. Mixers with simple fittings, such as spirals. (see e.g. U.S. Pat. No. 3,286,992, German Offenlegungsschrift 2,119,239 and U.S. Pat. No. 3,704,006).
   b. Multichannel mixers (for example, the AMK-Ross-IDG Mixers manufactuted by Aachener Misch and Knetmaschinen Fabrik, West Germany)
   c. So-called "packing mixers", for example the static mixers manufactured by Sulzer AG (Winterthur, Switzerland) and the BKM-Mixers manufactured by Bayer AG (West Germany). See e.g. U.S. Pat. No. 3,785,620 and German Offenlegungsschrift 2,328,795 corresponding to U.S. Ser. No. 474,836, respectively).
   d. Further variants of static mixers are mixing nozzles, for example, those manufactured by the Lechler Company (Stuttgart, West Germany) or the mixing chambers in the HK-machines manufactured by the Hennecke Company (Birlinghofen, West Germany) into which the starting products are injected under high pressure (counter-current injection).

Dynamic mixers suitable for use in the process according to the invention include the flow mixers manufactured by the companies Ekato RMT (Schopfheim, West Germany), Lightnin (Neu-Isenburg, West Germany) and Hennecke (toothed stirrer) which, like the known impeller-type homogenizing machines, operate on the stator-rotor principle, but cannot be used to perform feed or delivery functions. The energy required for dispersion in general amounts to from 1 to more than 10 KW per liter of mixer volume, depending upon the required particle size, the type of mixer used and the viscosity of the starting materials.

In cases where anhydrous amines, hydrazines and hydrazides are used, there is no need for any further working-up on completion of the polyaddition reaction. However, in cases where aqueous amines (for example, aqueous ethylene diamine solution or hydrazine hydrate) are used, it is advisable in some cases to remove the water from the dispersion in vacuo.

Preferably the process according to the invention is carried out by introducing the three components (polyether, NH-component and isocyanate) from separate supply vessels through metering pumps into a flow mixer in which they are thoroughly mixed and in which, at the same time, most of the polyaddition reaction takes place. However, it is also possible to combine the amine component with the hydroxyl compound before introduction into the flow mixer. The substantially reacted product is then introduced into a receiver in which it is optionally stirred to complete the reaction, optionally with heating to a temperature of from 50° to 150° C. In cases where aqueous amines are used, the end products are, if desired, freed in vacuo from the water present therein.

Other starting components suitable according to the invention for use is the production of the foams are aliphatic, cycloaliphatic, araliphatic, aromatic and heterocyclic polyisocyanates of the type previously described.

According to the invention, water and/or readily volatile organic substances are used as blowing agents. Organic blowing agents include acetone, ethyl acetate, halogen-substituted alkanes, such as methylene chloride, chloroform, ethylidene chloride, vinylidene chloride, monofluorotrichloromethane, chlorodifluoromethane, and dichlorodifluoromethane; butane, hexane, heptane, diethyl ether and the like. A blowing effect may also be obtained by adding compounds such as azo-compounds which decompose at temperatures above room temperature giving off gases (such as nitrogen). A suitable azo- compound is azoisobutyronitrile. Further examples of blowing agents and information on the use of blowing agents may be found in Kunststoff-Handbuch, Vol. VII, Vieweg and Hochtlen, Carl-Hanser-Verlag, Munich 1966 pages 108 and 109, 453 to 455 and 507 to 510.

In many cases, catalysts are also used in producing the foams in accordance with the invention. Suitable known catalysts include tertiary amines, such as triethylamine, tributylamine, N-methyl morpholine, N-ethyl morpholine, N-coco-morpholine, N,N,N',N'-tetramethyl ethylene diamine, 1,4-diazabicyclo-(2,2,2)-octane, N-methyl-N'-dimethyl amino ethyl piperazine, N,N,-dimethyl benzylamine, bis-(N,N-diethylaminoethyl)-adipate, N,N-diethyl benzylamine, pentamethyl diethylene triamine, N,N-dimethyl cyclohexylamine, N,N,N', N'-tetramethyl-1,3-butane diamine, N,N-dimethyl-$\beta$-phenylethyl amine, 1,2-dimethyl imidazole and 2-methylimidazole. Other suitable catalysts are known Mannich bases of secondary amines, such as dimethyl amine, and aldehydes, preferably formaldehyde, or ketones, such as acetone, methylethyl ketone, cyclohexanone, and phenols, such as phenol, nonyl phenol and bis-phenol.

Tertiary amines containing isocyanate-reactive hydrogen atoms may also be used as catalysts and include triethanolamine, triisopropanolamine, N-methyl diethanolamine, N-ethyl diethanolamine, N,N-dimethyl ethanolamine, also their reaction products with alkylene oxides, such as propylene oxide and/or ethylene oxide.

Other suitable catalysts are sila-amines with carbon-silicon bonds of the type described, for example, in U.S. Pat. No. 3,620,984. Specific examples include 2,2,4-trimethyl-2-silamorpholine and 1,3-diethylaminomethyl tetramethyl disiloxane.

It is also possible to use as catalysts nitrogen-containing bases, such as tetraalkyl ammonium hydroxides; alkali metal hydoxides, such as sodium hydroxide, alkali metal phenolates, such as sodium phenolate, or alkali metal alcoholates, such as sodium methylate. Hexahydrotriazins may also be used as catalysts.

According to the invention, organometallic compounds and more especially organo tin compounds may also be used as catalysts.

Preferred organotin compounds include tin (II) salts of carboxylic acids, such as tin (II) acetate, tin (II) octoate, tin (II) ethyl hexoate and tin (II) laurate, and tin (IV) compounds such as dibutyl tin oxide, dibutyl tin dichloride, dibutyl tin diacetate, dibutyl tin dilaurate, dibutyl tin maleate or dioctyl tin diacetate. It is of course, possible to use any of the above-mentioned catalysts in the form of mixtures.

Further representatives of catalysts suitable for use in accordance with the invention and information on the way in which they work, may be found in Kunstsoff-Handbuch, Vol, VII, by Vieweg and Höchtlen, Carl- Hanser-Verlag, Munich 1966 for example on pages 96 to 102.

The catalysts are generally used in a quantity of from 0.001 to 10% by weight, based on the quantity of the high molecular weight compound according to the invention.

According to the invention, it is also possible to use surface-active additives, such as emulsifiers and foam stabilizers. Examples of suitable emulsifiers include the sodium salts of castor oil sulphonates or salts of fatty acids with amines, such as diethylamine oleate or diethanolamine stearate. Alkaki metal or ammonium salts of sulphonic acids, for example, of dodecyl benzene sulphonic acid or dinaphthyl methane disulphonic acid, or of fatty acids, such as ricinoleic acid or of polymeric fatty acids may also be used as surface-active additives.

Suitable foam stabilizers include polyether siloxanes, especially those which are water-soluble. These compounds are generally synthesized in such a way that a copolymer of ethylene oxide and propylene oxide is attached to a polydimethyl siloxane radical. Foam stabilizers of this type are described, for example, in U.S. Pat. Nos. 2,834,748; 2,917,480 and 3,629,308.

According to the invention, it is also possible to use reaction retarders such as acid-reacting substances (e.g. hydrochloric acid or organic acid halides), cell regulators, such as paraffins, fatty alcohols or dimethyl polysiloxanes; pigments, dyes, flame-proofing agents, such as tris-chloroethyl phosphate, tricesyl phosphate or ammonium phosphate and polyphosphate; stabilizers against ageing and weathering; plasticizers, fungistatic and bacteriostatic compounds and fillers, such as barium sulphate, kieselguhr, carbon black or whiting.

Other examples of surface-active additives, foam stabilizers, cell regulators, reaction retarders, stabilizers, flameproofing agents, plasticizers, dyes, fillers, and fungistatic and bacteriostatic compounds, optionally used in accordance with the invention, and also details on the way additives of this type are used and the way in which they work may be found in Kunststoff-Handbuch, Vol, VII, Vieweg and Höchtlen, Carl-Hanser-Verlag, Munich 1966 pages 103-113.

According to the invention, the reaction components may be reacted by the known one-stage process, by the prepolymer process or by the semi-prepolymer process, in many cases using machines, for example, those of the type described in U.S. Pat. No. 2,764,565. Particulars of processing machines which may also be used in accordance with the invention may be found in Kunststoff-Handbuch, Vol. VII, Vieweg and Hochtlen, Carl-Hanser-Verlag, Munich 1966, pages 121 to 205.

According to the invention, the foams are often produced by foaming in molds. To this end, the reaction mixture is introduced into a mold. Suitable mold materials include metals (for example, aluminum) or plastics (for example, epoxide resin). In the mold, the foamable reaction mixture foams and forms the molding. In-mold foaming may be carried out in such a way that the molding has a cellular structure over its surface, although it may also be carried out in such a way that the molding has a compact skin and a cellular core. According to the invention, it is possible in this connection to introduce into the mold such a quantity of foamable reaction mixture that the foam formed just fills the mold. However, it is also possible to introduce into the mold more foamable reaction mixture than is required to fill the interior of the mold with foam. This technique is known as "over charging" and is described, for example in U.S. Pat. No. 3,178,490 and 3,182,104, In many cases "external release agents", such as silicone oils, are used during in-mold foaming. However, it is also possible to use so-called "internal release agents", optionally in admixture with external release agents, as known, for example, from German Offenlegungsschriften 2,121,670 and 2,307,589.

Cold-hardening foams may also be produced in accordance with the invention (cf. British Pat. No. 1,162,517, German Offenlegungsschrift No. 2,153,086).

It is further possible to produce foams by block foaming or by the known double conveyor belt process.

The foams produced by the process according to the invention may be used, for example, as upholstery materials, mattresses, packaging materials, shock-absorbing motor-vehicle components, films for laminating purposes and as insulating materials. The highly flexible foams produced by the process according to the invention are particularly suitable for flame lamination with films, woven fabrics and knitted fabrics of natural and synthetic materials. Films of these foams may also be effectively welded by high-frequency and ultrasonic welding. The hard polyurethane foams produced are also suitable for the production of articles with an integral structure or for the production of sandwich elements. The foams may either be produced by the in-mold foaming process or may be obtained by fabrication from block-foamed materials. They may be processed by deep-drawing, stamping or hot-forming.

The process according to the invention is illustrated by the following examples. Unless otherwise indicated, parts are parts by weight and percentages percent by weight.

EXAMPLE 1 a. Preparation of the polyether dispersion 800 g/minute of a polyether produced from propylene oxide, ethylene oxide and trimethylolpropane (hydroxyl number 28, approximately 80% by weight of the OH groups as primary OH-groups), 169 g/minute of a mixture of 80% by weight, of 2,4- and 20% by weight of 2,6-tolylene diisocyanate and 49 g/minute of hydrazine hydrate, are continuously introduced at room temperature into two toothed stirrers arranged one behind the other (chamber volumes 1.5 liter and 0.5 liter, respectively; rotational speed 1500 rpm). The three components are directly introduced separately from one another into the mixing zone of the first toothed stirrer. The polyether is delivered from the supply vessel through a gear pump, while the two thinly liquid components are introduced from separate supply vessels through piston-type metering pumps. The highly exothermic polyaddition reaction takes place in the toothed stirrers. The reaction temperature is adjusted to from 100 to 105° C by cooling the toothed stirrers. After a residence time of approximately 2 minutes, an almost completely reacted white dispersion leaves the second toothed stirrer. The dispersion formed, which has not yet fully reacted, is transferred to a dwell vessel where it is stirred at a temperature of from 80 to 100° C.

After stirring, the water emanating from the hydrazine hydrate is distilled off in vacuo at 100° C, leaving a stable, white, finely divided dispersion having a solids content of 20%, with an OH-number of 22.5, a viscosity of 3700 cP/25° C and a pH-value of 8.3.

b. Production of a highly flexible foam 50 parts, by weight, of the polyether dispersion prepared in accordance with Example 1 (a) are diluted with 50 parts of the ethylene oxide-propylene oxide polyether used in Example 1 (a). 100 parts of this dispersion are mixed with 3.2 parts of water, 0.2 parts of 1,4-diaza-(2,2,2)-bicyclooctane (triethylene diamine), 0.2 parts of dimethylbenzylamine, 0.5 parts of a commercialy available polyetherpolysiloxane (foam stabilizer "B 320738 produced by Messrs. Th. Goldscumidt/Essen. Western Germany)) 2.0 parts of triethanolamine and 37.7 parts of a mixture of 2,4- and 2,6-diisocyanatotoluene (80% of 2,4- and 20% of 2,6-isomer), and the resulting mixture applied to the conveyor belt of a foaming machine. Foam formation begins after a cream period of 9 seconds and is over after 80 seconds. The foam formed is highly flexible and has the following mechanical data:

| Density | (kg/m³) | 30 |
|---|---|---|
| Tensile strength | (KPa) | 110 |
| Elongation at break | (%) | 155 |
| Compression hardness (at 40% compression) | (KPa) | 1.86 |
| SAG-factor | | 2.7 |

The foam is self-extinguishing in ASTM-Test D 1692-68. It also passes the fire test according to MVSS 302-Docket 3-3.

EXAMPLE 2 a. Preparation of the polyether dispersion

The procedure is as in Example 1 (a). 800 g/minute of a polyether of propylene oxide, ethylene oxide and trimethylolpropane (hydroxyl number 34, approximately 80% by weight of the OH groups are primary hydroxyl groups), 169 g/minute of a mixture of 80%, by weight of 2,4- and 20% by weight of 2,6-tolylene diisocyanate and 49 g/minute of hydrazine hydrate, are introduced into the two toothed stirrers. Removal of the water by distillation leaves a stable, white, finely divided 20% by weight dispersion with an OH-number of 27, a viscosity of 3300 cP/25° C and a pH-value of 8.2.

b. Production of a highly flexible foam 50 parts of the polyether dispersion prepared in accordance with Example 2 (a) are diluted with 50 parts of the polyether used in preparing the dispersion. 100 parts of the resultant dispersion are mixed with 3.2 parts of water, 0.3 parts of 1,4-diaza-(2,2,2)-bicyclooctane, 1.0 part of a commercially available polyetherpolysiloxane foam stabilizer, 2.0 parts of triethanolamine and 38.1 parts of a mixture of 2,4- and 2,6-diisocyanatotoluene (80% of 2,4- and 20% of 2,6-isomer), and the resulting mixture applied to the conveyor belt of a foaming machine. Foam formation begins after a cream period of 7 seconds and is over after 57 seconds. The foam obtained is highly flexible and has the following mechanical propeties:

| Density | (kg/m³) | 29 |
|---|---|---|
| Tensile strength | (KPa) | 95 |
| Elongation at break | (%) | 175 |
| Compression hardness | (KPa) | 1.96 |
| SAG-factor | | 2.9 |

The foam is self-extinguishing in ASTM-test D-1692-68 and passes the fire test according to MVSS 302-Docket 3-3.

EXAMPLE 3 a Preparation of the polyether dispersion

The procedure is as in Example 1, except that 1600 g/minute of a polyether of propylene oxide, ethylene oxide and trimethylolpropane (hydroxyl number 35, approximately 70% primary hydroxyl groups), 338 g/minute of a mixture of 80% by weight of 2,4- and 20% by weight of 2,6-tolylene diisocyanate and 98 g/minute of hydrazine hydrate, are introduced into the toothed stirrers. The residence time in the stirrers is approximately 1 minute.

Removal of the water by distillation leaves a stable, white, finely divided 20% by weight dispersion with an OH-number of 28, a viscosity of 2900 cP/25° C and a pH-value of 8.1.

b. Production of a highly flexible foam 50 parts of the polyether dispersion prepared in accordance with Example 3 (a) are diluted with 50 parts of the ethylene oxide-propylene oxide polyether present in the dispersion. 100 parts of the resultant dispersion are mixed 3.2 parts of water, 0.2 parts of 1,4-diaza-(2,2,2)-bicyclooctane, 0.25 parts of dimethyl benzylamine, 2.0 parts of a commericially available polyetherpolysiloxane foam stabilizer and 38.2 parts of a mixture of 2,4- and 2,6-diisocyanato-toluene (80% of 2,4- and 20% of 2,6-isomer) and the resulting mixture appliedto the converyor belt of a foaming machine. Foam formation begins after cream period of 11 seconds and is over after 90 seconds.

The highly flexible foam obtained has the following properties:

| Density | (kg/m³) | 30 |
|---|---|---|
| Tensile Strength | (KPa) | 115 |
| Elongation at break | (%) | 150 |
| Compression hardness | (KPa) | 2.16 |
| SAG-factor | | 2.6 |

The foam is self-extinguishing in ASTM-Test D 1692-68 and passes the fire test according to MVSS 302- Docket 3-3.

EXAMPLE 4 a. Production of highly flexible foam 50 parts of the polyether dispersion prepared in accordance with Example 2 (a) are diluted with 50 parts of the trifunctional trimethylol-propane started polyether containing ethylene oxide and propylene oxide units. 100 parts of this dispersion are mixed with the following components: 2.0 parts of water, 0.2 parts of 1,4-diaza-(2,2,2)-bicyclooctane, 0.2 parts of dimethyl benzyl amine, 1.0 part of a commercially available polyetherpolysiloxane foam stabilizer 2.0 parts of triethanolamine and 38.1 parts of a mixture of 2,4- and 2,6-diisocyanatotoluene (80% of 2,4- and 20% of 2,6-isomer). The resulting mixture is applied to the conveyor belt of a foaming machine where foam formation begins after a cream period of 9 seconds and is over after 82 seconds.

The highly flexible foam obtained has the following mechanical properties:

| | | |
|---|---|---|
| Density | (kg/m³) | 47 |
| Tensile strength | (KPa) | 95 |
| Elongation at break | (%) | 100 |
| Compression hardness (at 40% compression) | (KPa) | 5.8 |

EXAMPLE 5 a. Preparation of the polyether dispersion 7.3 parts of hydrazine hydrate are dissolved in 500 parts of a polyether with a hydroxyl number of 28 which was obtained by the addition of propylene oxide and then ethylene oxide to trimethylol propane and 67% by weight of whose OH— groups are primary OH-groups. 25.3 parts of a mixture of 2,4- and 2,6-tolylene diisocyanate (80% by weight of 2,4- and 20% by weight of 2,6-isomer) are separately dissolved in another 500 parts of the same polyether. The polyether-tolylene diisocyanate solution is run with stirring into the polyetherhydrazine hydrate solution, the mixture immediately becoming clouded. After the two solutions have been combined, they are stirred for 5 minutes. A whitish, clouded polyether dispersion is obtained with a hydroxyl number of 27, a viscosity of 2242 centipoises at 25° C and a reaction product content of 2.9% by weight.

b. Production of a highly flexible foam 103.3 parts of the polyether dispersion prepared in accordance with Example 5 (a) are mixed with 2.9 parts of water, 0.3 parts of triethylene diamine, 0.25 parts of tin(II) octoate and 34.5 parts of a mixture of 2,4- and 2,6-tolylene diisocyanate (80% of 2,4- and 20% of 2,6-isomer) and the resulting mixture applied to the conveyor belt of a foaming machine. Foam formation begins after a cream period of 8 seconds and is over after 80 seconds. The foam obtained is highly flexible and shows favorable mechanical properties as may be seen from the following table:

| | | |
|---|---|---|
| Density | (kg/m³) | 34 |
| Tensile strength | (KPa) | 125 |
| Elongation at break | (%) | 270 |
| Compression hardness 40% | (KPa) | 3.04 |
| SAG-factor | | 2.8 |

EXAMPLE 6 TO 13 a. Preparation of the polyether dispersion

Following the procedure of Example 5 (a), dispersions of reaction products in polyethers are obtained by combining solutions of hydrazines in polyethers with solutions of polyisocyanates in polyethers. The quantities of isocyanates and hydrazines are shown in the following Table. The quantity of polyether specified is the total quantity which was distributed in equal amounts between isocyanate and hydrazine for carrying out the process.

All the products obtained were cloudy and generally colorless. The polyether dispersions prepared from phenyl hydrazine were yellow-brown in color. The properties of the polyether dispersions are shown in the Table.

| Example | 6 | 7 | 8 | 9 | 10 | 11 | 12 | 13 |
|---|---|---|---|---|---|---|---|---|
| Polyether* | 100 | 100 | 100 | 100 | 300 | 300 | 300 | 300 |
| Anhydrous hydrazine | | | | 1.16 | | | | |
| Hydrazine hydrate | 1.45 | | | | 2.9 | 2.1 | 2.1 | 3.0 |
| Phenyl hydrazine | | 1.53 | | | | | | |
| Methyl hydrazine | | | 0.63 | | | | | |
| Tolylene diisocyanate (80% 2,4-, 20% 2,6-) | 5.07 | 2.47 | 2.37 | 5.07 | | | | |
| Tolylene diisocyanate (65% 2,4-, 20% 2,6-) | | | | | 10.1 | | | |
| Diphenyl methane-4,4'-diisocyanate | | | | | 10.1 | 10.6 | | |
| Crude diphenyl methane-4,4'-diisocyanate | | | | | | | 10.6 | |
| 1,6-Hexamethylene diisocyanate | | | | | | | | 10.1 |
| Hydroxyl number | 28 | 27 | 27 | 28 | 27 | 27 | 27 | 27 |
| Viscosity (cP at 25° C) | 3530 | 3463 | 1909 | 3974 | 2242 | 8258 | 1931 | 3814 |
| Solids content (%, by weight) | 6 | 4 | 3 | 6 | 3 | 3 | 3 | 3 |

*Hydroxyl number 28, obtained by adding propylene oxide and then ethylene oxide to trimethylol propane b. Production of soft flexible foams:

The polyether dispersions prepared in accordance with 6 (a), 7 (a) and 8(a) were reacted to form foams by admixture with the component indicated in the ratio specified. The quantities specified are in parts by weight.

| Example | 6 | 7 | 8 |
|---|---|---|---|
| Polyether dispersion | 100 | 100 | 100 |
| Water | 3.2 | 3.2 | 3.2 |
| Triethylene diamine | 0.3 | 0.3 | 0.3 |
| Tin (II) octoate | 0.25 | 0.25 | 0.25 |
| Tolylene diisocyanate (80% 2,4, 20% 2,6-) | 34.5 | 38.5 | 34.5 |
| NCO/OH-ratio | 0.95 | 1.05 | 0.95 |
| Cream Period (seconds) | 7 | 7 | 8 |
| Rise Time (seconds) | 73 | 70 | 90 |
| Gel Time (seconds) | 115 | 112 | 122 |

The foams obtained are highly elastic and have favorable strength values, as shown in the following table.

| Example | 6 | 7 | 8 |
|---|---|---|---|
| Density (kg/m³) | 35 | 33 | 30 |
| Tensile Strength (KPa) | 120 | 120 | 100 |
| Elongation at Break (%) | 235 | 215 | 255 |
| Compression hardness 40% (KPa) | 3.63 | 3.14 | 1.77 |
| SAG factor | 2.7 | 2.8 | 2.9 |

EXAMPLE 14 a. Preparation of the polyether dispersion

Following the procedure of Example 2 (a), a 10% by weight polyurea dispersion is prepared in a trifunctional polyether based on trimethylol propane, propylene oxide and ethylene oxide (hydroxyl No. 34, approximately 80% of primary hydroxyl groups) by reacting phenyl isocyanate with pentaethylene hexamine.

b. Production of a soft elastic foam 100 parts of the polyether dispersion prepared in accordance with Example 14 (a) are mixed with 30 parts of water, 0.5 parts of a phenyl methyl silicone oil with the average composition:

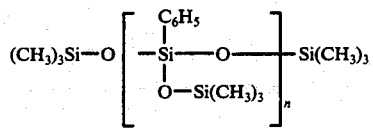

wherein
$n$ (70%) = 1 and (30%) = 2;
0.3 parts of triethylene diamine, 0.3 parts of tin(II) octoate and 32 parts of a mixture of 2,4- and 2,6-tolylene diisocyanate (80% of 2,4- and 20% of 2,6-isomer). A very soft foam with extremely good strength values is obtained.

EXAMPLE 15 a. Preparation of the polyether dispersion.

49 parts of hydrazine hydrate are dissolved in 800 parts of a polyether with a hydroxyl number of 28, which was obtained by adding propylene oxide and then ethylene oxide to trimethylol propane and 80% by weight of whose OH-groups are primary OH-groups. 169 parts of a mixture of 2,4- and 2,6-tolylene diisocyanate (80% by weight of 2,4- and 20% by weight of 2,6-isomer) are separately dissolved in another 800 parts of the same polyether. The polyether-tolylene diisocyanate solution is run with stirring into the polyether-hydrazine hydrate solution, the mixture immediately becoming clouded. After the two solutions have been combined, they are stirred for 5 minutes. A whitish, clouded polyether dispersion is formed with a hydroxyl number of 25, a viscosity of 8800 centipoises at 25° C and a reaction product content of 10% by weight.

b. Production of a soft flexible foam 100 parts of the polyether dispersion prepared in accordance with Example 15 (a) are mixed with 30 parts of water, 0.1 part of a polyether siloxane, 0.3 parts of triethylene diamine, 0.25 parts of tin(II) octoate and 32 parts of a mixture of 2,4- and 2,6-diisocyanato toluene (80% of 2,4- and 20% of 2,6-isomer). Foam formation begins after cream period of 9 seconds and is over after 60 seconds.

The foam obtained has the following mechanical properties:

| Density | (kg/m³) | 35 |
|---|---|---|
| Tensile strength | (KPa) | 180 |
| Elongation at break | (%) | 175 |
| Compression hardness at 40% compression | (KPa) | 5.60 |

EXAMPLE 16

Production of a soft flexible foam using an allophonate polyisocyanate:

50 parts of the polyether dispersion prepared in accordance with Example 1 (a) are mixed with 50 parts of a trifunctional polyether based on trimethylol propane, ethylene oxide and propylene oxide (hydroxyl number 28, approximately 80% of primary OH groups). The resultant dispersion is converted into a foam by the addition of 2.2 parts of water, 0.17 parts of triethylene diamine, 3.2 parts of diisopropanolamine, 1.0 part of triethanolamine, 1.0 parts of the phenyl methyl silicone oil described in Example 14 (b) and 47.5 parts of a tolylene diisocyanate containing allophanate groups (% NCO 40.5, viscosity 19 centipoises at 25° C).

The thus-formed foam is highly flexible and has the following mechanical properties:

| Density | (kg/m³) | 45 |
|---|---|---|
| Tensile strength | (KPa) | 85 |
| Elongation at break | (%) | 70 |
| Compression hardness | (KPa) | 4.60 |
| SAG-factor | | 2.6 |

The foam is self-extinguishing in the ASTM test D 1692–68 and also passes the MVSS 302-Docket 3–3 test.

EXAMPLE 17

Production of a soft flexible molding 50 parts of the polyether dispersion obtained in accordance with Example 3 (a) are mixed with 50 parts of a pentafunctional polyether based on pentaerythritol, propylene oxide and ethylene oxide (OH-number 35). 100 parts of the dispersion are mixed with 4.5 parts of water, 0.1 part of triethylene diamine, 1.0 part of a commercially available polyetherpolysiloxane foam stabilizer, 0.075 parts of tin(II) octoate and 50 parts of tolylene diisocyanate (mixture of 3 parts by weight of the 80% 2,4- and 20% 2,6-isomer mixture with 1 part by weight of the 65% 2,4- and 35% 2,6-isomer mixture), resulting in the formation of a foamable mixture. Before foam formation begins, the prepared mixture is introduced into an aluminum mold for an arm rest for a motor car and in which foam formation begins. A foam with the following properties is obtained after hardening:

| Density | (kg/m³) | 30 |
|---|---|---|
| Tensile strength | (KPa) | 90 |
| Elongation at break | (%) | 100 |
| Compression hardness (at 40% compression) | (KPa) | 6.20 |

EXAMPLE 18

Production of a highly flexible molding 50 parts of the polyether dispersion prepared in accordance with Example 2 (a) were diluted by the addition of 50 parts of a trifunctional polyether based on trimethylol propane, ethylene oxide and propylene oxide (OH-number 28, approximately 80% of primary hydroxyl groups).

The resulting dispersion is then converted into a foamable mixture by the addition of the following components: 2.9 parts of water, 0.18 parts of triethylene diamine, 0.8 parts of N-methyl morpholine, 0.08 parts of bis-(dimethyl aminoethyl)-ether, 0.05 parts of a commercially available polyetherpolysiloxane foam stabilizer, 1.0 part of the phenyl methyl silicone oil described in Example 14 (b), 0.03 parts of dibutyl tin dilaurate and 36 parts of a mixture of 80% by weight of tolylene diisocyanate (80% of 2,4- and 20% of 2,6-isomer) and 20% by weight of the phosgenation product of a crude aniline-formaldehyde condensate. The foamable mixture is introduced into a mold in which it can expand to form the molding. The properties of an identical molding produced by in-mold foaming are shown below, the only difference being that, in the one case, the mold was only filled to such an extent that the volume of the expanded molding just filled the mold cavity, whereas in the other case the mold was "overcharged" so that the foam as a whole was densified.

The highly flexible foams obtained under both conditions had the following properties:

| Foam | Normal charging | Over charging |
|---|---|---|
| Density (kg/m$^3$) | 37 | 41 |
| Tensile strength (KPa) | 150 | 165 |
| Elongation at break (%) | 165 | 170 |
| Compression hardness (at 50% compression) (KPa) | 3.20 | 4.0 |
| Inflammability according to ASTM D 1692-68 | self-extinguishing (SE) | self-extinguishing (SE) |
| Fire test according to MVSS 302, Docket 3-3 | passed | passed |

EXAMPLE 19 AND 20

Production of foam moldings with a compact surface and a cellular core and with integral density distribution over the cross section of the moldings by foaming a foamable reaction mixture of polyisocyanates, polyethers with hydroxyl groups and a molecular weight of from 50 to 4000, optionally in admixture with other compounds containing at least two active hydrogen atoms, blowing agents, and optional additives in a closed mold, the temperature of the inner surfaces of the mold being maintained at least 50° C below the maximum reaction temperature of the foaming reaction mixture.

EXAMPLE 9

Component (A)

120 parts of the dispersion prepared in accordance with Example 2 (a);

60 parts of 1,4-butane diol;

1.5 parts of permethylated diethylene triamine as activator;

10.0 parts of monofluorotrichloromethane; and 1.0 part of silicone stabilizer.

Component (B)

275.0 parts of diisocyanate based on diphenyl methane-4,4'-diisocyanate liquified by reaction with 14% of tripropylene glycol.

Components (A) and (B) are mixed through a two-component measuring mixer and the resulting mixture introduced into a closed, tempered metal mold at a temperature of 75° C.

The mixture begins to foam after 25 seconds and sets after 55 seconds. The molding is removed after 10 minutes. It has an overall gross density of 0.67 g/cm$^3$ and a material thickness of 10 mm with a solid peripheral zone on both sides. Mechanical properties of the foam produced are:

E-modulus (bending test) $E_b = 5500$ kp/cm$^{-2}$

Elongation at break, tensile test, in accordance with DIN 53 455 (standard bar 3):

$\epsilon_{zB} = 70\%$

Dimensional stability to heat under flexural stress, in accordance with DIN 53 424 (bending tension approx. 3 kp/cm$^{-2}$):99° C with a 10 mm sag.

EXAMPLE 20 a. Preparation of the polyether dispersion

A mixture of 4000 g/minute of a trifunctional polyether based on trimethylol propane and ethylene oxide (hydroxyl number 550) and 245 minute of hydrazine hydrate, which are mixed in a preceding toothed stirrer (chamber volume 0.5 liter), and 845 g/minute of a mixture of 80% by weight of 2,4- and 20% by weight of 2,6-tolylene diisocyanate, are continuously introduced at room temperature into a high speed impeller-type homogenizer (volume 0.5 liter, rotational speed 3800 rpm). Both components are directly introduced into the mixing zone of the homogenizer separately from one another. The mixture undergoes an increase in temperature both under the effect of the incipient polyaddition reaction and under the effect of the high shear forces generated. The dispersion formed, issuing from the homogenizer with a temperature of approximately 90° C is transferred to a dwell vessel in which it is stirred for 30 minutes at a temperature of from 80 to 100° C. Removal of the water by distillation leaves a white, stable, finely divided 20% dispersion with an OH number of 495, a viscosity of 3200 cP/25° C and a pH-value of 8.1.

b. Production of the foam molding

Component (A)

100 parts of the polyether dispersion prepared in Example 20 (a);

19 parts of a polyester obtained by condensation from adipic acid, phthalic acid anhydride and trimethylol propane (OH number: 370);

1 part of a commercially available polyether-polysiloxane foam stabilizer (SF 11/09, manufactured by General Electric);

0.4 parts of tetramethyl guanidine;

0.1 part of permethylated diethylene triamine, and 4 parts of monofluorotrichloromethane.

Component (B)

150 parts of polyisocyanate in the form of a mixture of 50% of crude, 4,4'-diisocyanato diphenyl methane and 50% of distilled 4,4'-diisocyanato diphenyl methane modified by reaction with 5% of tripropylene glycol.

Components (A) and (B) are mixed and the resulting mixture introduced into a closed, tempered metal mold. The mold termperature is 75° C.

The mixture begins to foam after 25 seconds and sets after 40 seconds. The molding is removed from the mold after 10 minutes. It has an overall gross density of 0.67 g/cc and a material thickness of 10 mm with a solid peripheral zone on both sides.

Mechanical properties of the plastics produced are:

E-modulus (bending test) $E_b = 13,000$ kp/cm$^{-2}$

Elongation at break, tensile test, in accordance with DIN 53 455 (standard bar 3):

$\epsilon_{zB} = 13\%$

Dimensional stability to heat under flexural stress, in accordance with DIN 53 424 (bending tension approx. 3 kp/cm$^{-2}$): 85° C with a 10 mm dip.

EXAMPLE 21 a. Preparation of the polyether dispersion 400 g/minute of a linear polypropylene glycol polyether with an ethylene oxide end block (hydroxyl number 28, approximately 80% of primary hydroxyl groups) and 49 g/minute of hydrazine hydrate are synchronously introduced at room temperature into a static mixer according to U.S. Pat. No. 3,286,992 (diameter: 6.3 mm, length: 290mm, number of elements: 24) for emulsification through two of the heads of a four-head reciprocating pump, while 400 g/minute of the same polyether and 169 g/minute of a mixture of 80% by weight of 2,4- and 20% by weight of 2,6-tolylene diisocynate are synchronously pumped by the other two heads through a second static mixer (diameter: 6.3 mm, length: 290 mm, number of elements: 24). The mixtures leaving the two static mixers are then thoroughly mixed in a third static mixer (diameter 6.3 mm, length: 152 mm, number of elements: (12). Part of the polyaddition reaction actually takes place in this static mixer, the mixture undergoing an increase in temperature to from 60° to 80° C. The dispersion flows from the mixer into a dwell vessel in which it is stirred for 30 minutes at a temperature of from 80 to 100° C to complete the reaction. The dispersion is then freed from water in vacuo.

A stable, white, finely divided 20% dispersion with an OH number of 22.5, a viscosity of 2470 cP/25° C and a pH-value of 8.1 is obtained.

b. Production of a semi-hard polyurethane foam

The following components are mixed together:
35 parts of the polyether dispersion of Example 21(a);
35 parts of the linear polyether used for the preparation of dispersion 21(a) (OH number 28, approximately 80% of primary hydroxyl groups);
10 parts of a trifunctional polyether based on trimethylol propane, propylene oxide and ethylene oxide (hydroxyl number 35, approximately 70% of primary OH-groups);
10 parts of a pigment paste consisting of 99%, by weight, of a trifunctional polyether based on trimethylol propane, propylene oxide and ethylene oxide (OH—number 35) and 1% by weight, of carbon black;
14 parts of 1,4-butane diol;
1 part of ethylene glycol;
0.1 part of water;
0.5 part of triethylene diamine;
0.03 parts of dibutyl tin dilaurate;
7 parts of trichlorofluoromethane;
3 parts of methylene chloride; and
67.7 parts of an isocyanate mixture of 50% by weight of a reaction product from tripropylene glycol and diphenyl methane diisocyanate with an isocyanate content of 23% and 50 % by weight of a carbodiimide-modified diphenyl methane diisocyanate with an isocyanate content of 30%.

The semi-hard polyurethane foam obtained has the following properties:

| Density | (kg/m$^3$) | 497 |
|---|---|---|
| Tensile strength | (MPa) | 4.8 |
| Elongation | (%) | 134 |
| Tear propagation resistance | (KN/m) | 17.8 |
| Shore A-hardness | | 92 |
| Shore D-hardness | | 26 |
| 50% tensile stress | (MPa) | 3.2 |

EXAMPLE 22 a. Preparation of the polyether dispersion

The procedure is as in Example 1(a), except that 800 g/minute of the polyether of Example 1(a), 148.8 g/minute of the mixture of 2,4- and 2,6-tolylene diisocyanate and 67.4 g/minute of a 76% aqueous ethylene diamine solution are introduced into the two toothed stirrers. Removal of the water by distillation leaves a stable, white, finely divided 20% dispersion with an OH number of 27, a viscosity of 4600 cP/25° C and a pH-value of 10.1.

b. Production of a highly flexible molding 50 parts of the polyether dispersion prepared in accordance with Example 22(a) are diluted with additional 50 parts of the polyether used therein. 100 parts of this dispersion are mixed with 2.9 parts of water, 0.18 parts of triethylene diamine, 0.8 parts of N-methyl morpholine, 0.08 parts of bis-(dimethylaminoethyl)-ether, 0.1 part of a commercially available polyetherpolysiloxane foam stabilizer, 1.0 part of the phenylmethyl polysiloxane described in Example 14(b), 0.03 parts dibutyltin dilaurate and either 34.2 parts (corresponding to NCO-/OH = 1.0) or 36 parts (corresponding to NCO/OH = 1.05) of a polyisocyanate mixture consisting of 80% tolylene diisocyanate (80% 2,4- and 20% 2,6-isomer) and 20% of the phosgenation product of a crude aniline-formaldehyde condensate. The mixture is introduced into a mold in which it can expand to form the molding. The properties of identical moldings produced by in-mold foaming are shown in the following Table:

| Foam | NCO/OH = 1.0 | NCO/OH = 1.05 |
|---|---|---|
| Density (kg/m$^3$) | 40 | 39 |
| Tensile strength (KPa) | 185 | 195 |
| Elongation at break (%) | 205 | 185 |
| Compression hardness (at 40% compression) (KPa) | 3.20 | 3.92 |
| Permanent deformation (%) | | |
| at 50% | 4.8 | 3.3 |
| at 70% | 6.1 | 4.4 |
| at 90% | 10.0 | 5.6 |
| Tear propagation resistance (KN/m) | 0.43 | 0.43 |
| Inflammability according to ASTM D 1692-68 | self-extinguishing (SE) | self-extinguishing (SE) |
| Fire test according to MVSS 302, Docket 3-3 | passed | passed |

EXAMPLE 23 a. Preparation of the polyether dispersion

The procedure is as in Example 1(a), 800 g/minute of the polyether of Example 1(a). 45.3 g/minute of hydrazine hydrate and 171 g/minute of a mixture of 80% of tolylene diisocyanate (80% 2,4- and 20% 2,6-isomer) and 20% of a polyphenyl-polymethylene-polyisocyanate, obtained by phosgenation an aniline-formaldehyde condensate with an approximately 50% binuclear content, are introduced into the two toothed stirrers. A stable, finely divided 20% dispersion with an OH number of 27, a viscosity of 2900 cP/25° C and a pH-value of 7.5 is obtained.

b. Production of a highly flexible foam 50 parts of the polyether dispersion described in (a) are diluted with additional 50 parts of the polyether used therein. 100 parts of this diluted dispersion are mixed with 3.2 parts of water. 0.3 parts of 1,4-diaza-(2,2,2)-bicyclooctane, 1.0 part of a commercially available polyetherpolysiloxane foam stabilizer, 2.0 parts of triethanol amine and 38.1 parts of tolylene diisocyanate (80% 2,4- and 20% 2,6-isomer). The mixture applied to the conveyor belt of a foaming machine. Foam formation begins after cream period of 7 seconds and is over after 80 seconds. The foam formed is highly flexible and has the following mechanical data:

| Density | (kg/m$^3$) | 31 |
|---|---|---|
| Tensile Strength | (KPa) | 100 |
| Elongation at break | (%) | 180 |
| Compression hardness (at 40% compression) | (KPa) | 1.90 |
| SAG-factor | | 2.8 |

The foam is self-extinguishing in ASTM Test D 1692-68. It passes the fire test according to MVSS 320-Docket 3-3.

EXAMPLE 24 a. Preparation of the polyether dispersion

The procedure is as in Example 1(a), except that the amine is previously dissolved in the polyether. A solution of 97.7 g/minute of an aniline/formaldehyde condensate (consisting of 70% by weight of 4,4'-diamino diphenyl methane and 30% by weight of higher condensates) in 800 g of a trimethylol propane-started polyether (prepared from propylene oxide and ethylene oxide with an OH-number of 49 and containing predominantly secondary OH groups) and a mixture of 79.8 g/minute of tolylene diisocyanate (80% 2,4- and 20% 2,6-isomer) with 22.5 g/minute of an allophanate ((11.5 % NCO) from 6 mols of tolylene diisocyanate and mol of a polypropylene oxide with a terminal OH group (molecular weight: 2600)), are introduced into the two toothed stirrers. A stable, finely divided dispersion with an OH number of 39, a viscosity of 3500 cP/25° C and a pH-value of 7.5 is obtained.

b. Production of a soft flexible foam 50 parts of the dispersion are diluted with additional 50 parts of the trimethylol propane-started polyether. 100 parts of the diluted dispersion are mixed with 3.0 parts of water, 0.2 parts of 1,4-diaza-(2,2,2)-bicyclooctane, 1.0 part of a commercially available polyether-polysiloxane foam stabilizer, 0.3 parts of tin (II) octoate and 39.3 parts of tolylene diisocyanate. The mixture is applied to the conveyor belt of a foaming machine. Foam formation begins after cream period of 10 seconds and is over after 70 seconds. The foam formed is soft and flexible and has the following mechanical data:

| Density | (kg/m$^3$) | 30 |
|---|---|---|
| Tensile strength | (KPa) | 120 |
| Elongation at break | (%) | 220 |
| Compression hardness (at 40% compression) | (KPa) | 4.10 |

What is claimed is:

1. A process for the production of polyurethane foam comprising reacting in the presence of a blowing agent:
   a. an organic polyisocyanate, and
   b. a dispersion of a polyurea and/or a polyhydrazodicarbonamide in a relatively high molecular weight organic compound containing at least one hydroxyl group, wherein the concentration of the polyureas and/or polyhydrazodicarbonamide is from 1 to 40% by weight of the dispersion based on 100 parts by weight of said organic compound.

2. A process as claimed in claim 1 wherein the relatively high molecular weight organic compound is a polyether.

3. A process as claimed in claim 1 wherein the relatively high molecular weight organic compound is a polyether containing at least two hydroxyl groups.

4. A process as claimed in claim 3 wherein said polyether contains from 2 to 8 hydroxyl groups.

5. A process as claimed in claim 1 wherein the relatively high molecular weight organic compound has a molecular weight of from 200 to 16,000.

6. A process as claimed in claim 5 wherein said organic compound has a molecular weight of from 500 to 10,000.

7. A process as claimed in claim 1 wherein said dispersions are obtained by reacting:
   1. organic polyisocyanates, with
   2. polyamines containing primary and/or secondary amino groups and/or hydrazines and/or hydrazides, in
   3. polyethers containing at least one hydroxyl group; the dispersions being prepared by continuously introducing components (1), (2) and (3) into a flow mixer in such a quantity that the average residence time in the mixer is less than 10 minuts, the equivalent ratio between components (1) and (2) being from 0.8:1 to 1.05:1 and subsequently collecting the reaction product issuing from the flow mixer in a receiver.

8. A process as claimed in claim 7 wherein components (1), (2) and (3) are separately introduced into the flow mixer.

9. A process as claimed in claim 7 wherein component (1) is introduced separately from a mixture of components (2) and (3).

10. A process as claimed in claim 7 wherein the receiver is maintained at temperatures of from 50 to 150° C and wherein the components are stirred therein.

11. A process as claimed in claim 1 wherein polyhydrazodicarbonamides, obtained by reacting hydrazine with polyisocyanates, as the disperse phase are used.

12. A process as claimed in claim 1 wherein the polyureas and/or polyhydrazodicarbonamides present as the disperse phase are (1) reaction products of polyamines containing primary and/or secondary amino groups with isocyanates or (2) reaction products of hydrazines and/or hydrazides with isocyanates, the isocyanates being monofunctional, bifunctional, and/or higher functional and used in an NCO:NH equivalent ratio of from 0.8:1 to 1.05:1.

13. The foam produced by the process claimed in claim 1.

14. A process for the production of highly flexible polyurethane foams comprising reacting distilled tolylene diisocyanate with a polyether or polyethers having at least two hydroxyl groups in the presence of a blowing agent and in the presence of a reaction product of (a) hydrazine derivatives and/or hydrazine adducts of the general formula R—NH—NH—R' · (H$_2$O)$_m$ wherein R and R', which may be different or the same, each represent a hydrogen atom or an alkyl, cycloalkyl, aralkyl or acyl radical, and $n = 0$ or 1, and (b) a polyisocyanate, the reaction being carried out in the absence of foam stabilizers of the polyether-polysiloxane block copolymer type, wherein the compounds (a) and (b) are reacted in an NCO:OH equivalent ratio of 0.8:1 to 1.05:1.

15. The process of claim 14 wherein R and R' represent $C_1$–$C_{12}$ alkyl, $C_5$–$C_{14}$ cycloalkyl, $C_6$–$C_{14}$ aryl, $C_7$–$C_{20}$ aralkyl or $C_1$–$C_{12}$ acyl radicals.

16. The process of claim 14 wherein said polyether or polyethers have a molecular weight of from 1500 to 10,000 and wherein at least 10% by weight of the hydroxyl groups present are primary hydroxyl groups.

17. The process of claim 14 wherein the reaction mixture further includes members selected from the group consisting of catalysts, chain-extending agents, cross-linking agents and mixtures thereof.

18. The foam produced by the process claimed in claim 14.

* * * * *